United States Patent [19]

Lundberg et al.

[11] 4,196,236

[45] * Apr. 1, 1980

[54] FABRICATION MULTIPHASE PLASTICS FROM LIQUID SUSPENSION

[76] Inventors: Robert D. Lundberg, Somerville; Henry S. Makowski, Scotch Plains, both of N.J.

[*] Notice: The portion of the term of this patent subsequent to Oct. 11, 1994, has been disclaimed.

[21] Appl. No.: 873,014

[22] Filed: Jan. 27, 1978

Related U.S. Application Data

[60] Continuation of Ser. No. 705,466, Jul. 15, 1916, abandoned, which is a division of Ser. No. 610,826, Sep. 5, 1975, abandoned, which is a division of Ser. No. 429,162, Dec. 28, 1973, Pat. No. 3,925,280, which is a division of Ser. No. 229,487, Feb. 25, 1972, abandoned.

[51] Int. Cl.$^2$ ............................................. B05D 3/02
[52] U.S. Cl. .......................... 427/374 B; 260/31.8 R; 260/DIG. 31; 264/230; 427/133; 427/374 A; 427/380; 427/388 A; 427/388 D; 427/390; 525/242; 525/299; 525/302; 525/308; 525/322; 525/323; 525/390; 525/404; 525/426; 525/434; 525/442; 525/445; 526/17; 526/22; 526/27; 526/31; 526/317
[58] Field of Search .................. 526/27, 278, 31, 317, 526/240; 427/374 R, 374 A, 374 B, 379, 385 R; 260/885, 886, 880 B, 31.8 R, 878 B, 881, 884; 264/230

[56] References Cited

U.S. PATENT DOCUMENTS

| | | | |
|---|---|---|---|
| 1,249,770 | 12/1917 | Kempton | 427/374 B X |
| 3,097,961 | 7/1963 | Duperriez | 427/374 R X |
| 3,642,728 | 2/1972 | Canter | 526/31 X |
| 3,925,280 | 12/1975 | Lundberg et al. | 260/23 R |
| 3,947,387 | 3/1976 | Lunberg | 260/33.6 PQ X |
| 4,053,548 | 10/1977 | Lundberg et al. | 264/230 |
| 4,086,296 | 4/1978 | Carty et al. | 260/886 X |

*Primary Examiner*—Ronald H. Smith
*Assistant Examiner*—Thurman K. Page

[57] ABSTRACT

A process is disclosed for fabricating a thermoplastic, which thermoplastic is either a thermoplastic ionomer or a multiphase graft or block copolymer of the ABA (AB)$_n$, or

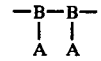

wherein n is greater than 1 and wherein the polymer blocks, A and B, are each thermoplastic resins having softening points substantially above room temperature with the B block being present in at least about 30 wt. % of the total polymer. The thermoplastic composition is first suspended in finely divided form in a liquid medium in a sufficient amount such that the solids content of the resulting suspension is in the range of from about 15 to about 75 wt. %. The liquid medium must be nonvolatile and must be capable of plasticizing the B block (or the backbone if the ionomer is employed) of the thermoplastic composition above the softening point of that block but must not be capable of plasticizing the A block to a substantial extent. The suspension is then applied as a coating to any desired surface, e.g., to wire, textiles, the interior of a mold, etc., and that surface is heated to a temperature at least 5° above the softening point of either polymer block thereby solidifying the composition in the shape of said surface. The process is useful in wire coatings, coatings on textiles, preparation of leather-like upholstery, flexible sheets, toys, etc.

8 Claims, No Drawings

FABRICATION MULTIPHASE PLASTICS FROM LIQUID SUSPENSION

This is a continuation of Ser. No. 705,466, filed July 15, 1976, now abandoned; which is a division of Ser. No. 610,826, filed Sept. 5, 1975, now abandoned; which is a division of Ser. No. 429,162, filed Dec. 28, 1973, now U.S. Pat. No. 3,925,280; which is a division of Ser. No. 229,487, filed Feb. 25, 1972, now abandoned.

BACKGROUND OF THE INVENTION

Plastics fabrication normally involves the use of massive machinery to extrude, mold, and calendar very viscous molten polymer. Due to the very high viscosity of such polymer melts, high pressures are used in the molding or extrusion process, often exceeding thousands of pounds per square inch. In addition to the substantial investment in the machinery for such processes, there are important limitations on the shape of the plastic object that can be generated in such operations. For example, it is often difficult to make extremely thin coatings or films of a plastic through an extrusion operation because very high temperatures are often required to generate the low melt viscosities needed for such thin objects. Often the polymers cannot withstand the high temperatures needed to provide such viscosities, and therefore, dilute solutions of such polymers in various organic solvents are employed to cast coatings. If this latter technique is employed (solvent casting) many disadvantages are encountered. Such a process involved substantial cost due to solvent recovery and the relatively low throughput of polymer per unit volume of intermediate (polymer plus diluent) handled. These and many other disadvantages make the fabrication of polymers an expensive process and often preclude fabrication of certain intermediate shapes.

Various techniques have been developed to circumvent these difficulties in polymer fabrication. Some involved a casting operation in which reactive prepolymers are combined with catalyst and coreactants, and poured as viscous liquids into the proper receptacle. Under these conditions a chain lengthening reaction ensues which is expedited by conducting the process at elevated temperatures. Such reactions often involve crosslinking steps in order to provide proper dimensional stability as rapidly as possible. Ideally, one might hope to conduct the polymerization process directly from monomer to yield the final product in desired form. Unfortunately the polymerization of most monomers is accompanied by the evolution of substantial amounts of heat and substantial shrinkage. This presents a major obstacle in creating plastic objects with precise surface detail in any casting operation involving significant amounts of low molecular weight monomer.

THE PRESENT INVENTION

A fabrication process has now been discovered which is rapid, involves a direct liquid-solid transition with minimum heat input, is not excessively exothermic, avoids substantial shrinkage, and does not require massive equipment to accommodate the transformation. Basically this process involves the suspension of a finely divided thermoplastic composition in a suitable liquid in sufficient amount such that solids content is in the range of from about 15 to about 75 wt. %. This liquid suspension can be described as a metastable state, i.e., at ambient temperatures no substantial change in viscosity or physical appearance would occur over a period of hours or days, thus insuring a desirable shelf life. To prepare the fabricated object from this suspension, a suitable amount can be poured directly into a mold cavity, flowed onto a suitable textile base, placed in a closed shell capable of being rotated through several planes to yield a uniform coating on the interior of said shell, etc. In each of these cases simply heating the mold, shell or coating will induce a liquid-solid transition due to plasticization of primarily only one of the phases in the multiphase plastic. Cooling the article permits recovery of the fabricated object which is now a plasticized semirigid or elastomeric product of high strength.

The thermoplastic compositions which are useful in the instant invention are either thermoplastic ionomers as more fully described hereafter, or graft or block copolymers falling within the following general structural formulae:

Block $$A-B-A \text{ or } (A-B)_n$$

Graft

wherein n is greater than 1 (i.e., two block systems are not suitable) and wherein polymer blocks A and B are each thermoplastic resins having softening points substantially above room temperature (25° C.), i.e., at least 10° C. above. Therefore, the softening points of either block should be at least 35° C., and should, for practical purposes, not exceed about 260° C., although, of course, higher softening points are also applicable. Preferably the softening points should be in the range of from about 50° C. to about 150° C. The B block must be present in from about 30 to as high as about 95 wt. % of total polymer, more preferably about 45 to about 90 wt. %, most preferably about 50 to about 80 wt. %. In order that distinct phases be present in the copolymer, each polymer block should contain above about 10 and preferably 50 or more monomeric units.

Methods of preparing block and graft copolymers are well-known and need not be recited here. In order to determine suitable monomeric constituents for a block or graft copolymer as described above, one need only determine the softening points of the homopolymers produced from these monomers and having the appropriate number of monomeric units. A blend or mixture of these homopolymers must also exist in separate distinct phases at ambient temperatures in order to insure that a copolymer prepared from selected monomeric constituents would be multiphase and useful in the instant invention.

Representative examples of copolymers which are suitable for use in the instant invention provided they fall within the above-defined general formulae are: poly-t-butylstyrene-polystyrene, polychlorostyrene-polystyrene, polycaprelactampolystyrene, polycaprolactone-polystyrene, polyamides, i.e. (hexamethylene diamine-adipic acid copolymers of Nylon 6,6)-polystyrene, polypropylene-polyethylene, polybutene-1-polypropylene, polyethylene-poly-4-methylpentene-1, polyacrylonitrile-polystyrene, polymethacrylonitrile-polystyrene, polymethacrylonitrile-polyethylene oxide, polyethyleneterephthalatepolyphenylhydroxyether of bisphenol A, polyphenylhydroxyether of bisphenol A-polysulfone (from bisphenol A and dichlorodiphenyl sulfone), polycaprolactam-poly-t-butyl styrene, polymethacrylonitrile-poly-t-butyl styrene, polymethylmetacrylate-poly-t-butylstyrene, polyethylene-poly-t-butyl styrene, (hexamethylene diamine-adipic acid copolymers or Nylon 6,6)-polyphenyl hydroxy ether of bisphenol A, polyacrylonitrile-polyvinylacetate, poly-t-butyl styrene-polyvinylacetate, etc.

Preferable copolymers include: poly-t-butyl styrenepolystyrene of the ABA type, polymethacrylonitrile-poly-t-butylstyrene, polyacrylonitrile-polystyrene of the ABA type, polycaprolactam-polystyrene of the $(AB)_n$ type etc. For reasons of economics and general utility those multiphase plastics which incorporate aromatic polymer blocks (especially polystyrene) are most preferred. Those systems involving polystyrene blocks can be employed with a wide range of non-volatile plasticizers ideally suited to this invention. Alternatively, polymer blocks based on poly-t-butylstyrene are desirable because these polymer blocks are readily solvated by nonvolatile, inexpensive oils of an aliphatic composition. The availability and low cost of these oils, therefore, can provide plasticized system of good properties and low cost. Each of these polymer blocks based on different aromatic monomers (for example, styrene and t-butyl styrene) will be solvated by different types of plasticizers and provide greatly different properties suitable for different applications.

The preparative techniques for these polymer blocks is well-known (see *Preparative Techniques of Polymer Chemistry;* Sorenson and Campbell, Interscience Publishers, 1968) and the means of combining these various blocks with each other is now well-known in the polymer art.

As mentioned previously, specific ionomeric polymers or ionomers are also applicable in the instant invention. These useful ionomers may be structurally defined as polymers having a backbone composed of a thermoplastic resin and having side chains or groups pendant to that backbone which groups are sufficiently polar so as to have the capability of forming ionic domains (i.e., the capability to associate with one another so as to form "physical crosslinks"). For convenience these polymers are referred to as thermoplastic ionomers.

Ionomeric polymers such as those employed in the instant invention are normally prepared by attaching acid groups to the polymer and then neutralizing the acid moiety with basic metal compounds (e.g., metal hydroxides, metal salts, etc.) or basic nitrogen compounds (i.e., ammonia, amines, etc.) to ionically link the polymers. Preferably, the metal ions employed are alkali metals or alkaline earth metals. The acid group may be introduced into the polymer chain in a variety of ways. One way is by introducing acid groups on the predominant polymer, e.g., by sulfonating polystyrene. Another way is by copolymerizing an unsaturated acid monomer with the predominant monomer, or by graft-polymerizing an unsaturated acid moiety on the predominant polymer. Examples of either of the latter two methods include use of carboxylic acids, sulfonic acids, phosphonic acids, etc. as the acid group.

Typical examples of ionomers employing salts of carboxylic acid type pendant groups are disclosed in British Pat. No. 1,011,981; U.S. Pat. No. 3,264,272; U.S. Pat. No. 3,322,734; U.S. Pat. No. 3,338,734; U.S. Pat. No. 3,355,319; U.S. Pat. No. 3,522,222; and U.S. Pat. No. 3,522,223. Typical examples of ionomers employing phosphonate-type pendant groups include those disclosed in U.S. Pat. No. 3,094,144; U.S. Pat. No. 2,764,563; U.S. Pat. No. 3,097,194; and U.S. Pat. No. 3,255,130.

Typical examples of ionomers employing sulfonate-type pendant groups include those disclosed in U.S. Pat. No. 2,714,605; U.S. Pat. No. 3,072,618; and U.S. Pat. No. 3,205,285. The techniques disclosed in these references may be employed to prepare the thermoplastic ionomers of the instant invention.

It should be apparent that in addition to direct sulfonation of these polymers or copolymers, a very convenient technique for incorporating a proper amount of sulfonate salt in these polymers is simply to copolymerize a suitable diene or difunctional molecule at a modest level (0.5 to 10%) with the desired monomer. For example, the copolymerization of 2 to 5 wt. % of ethylidene norbornene with ethylene using coordination catalysts provides a polyethylene with a small amount of unsaturation, yet the high crystallinity of polyethylene is still maintained. Direct sulfonation of the residual unsaturation provides a "sulfonated polyethylene" having excellent proporties for the fabrication process of this invention. The same approach can be taken with nearly all of the polymers suggested below.

The thermoplastic resin used as the backbone must meet the same requirements as to softening point as the lower softening block in the previously described block and graft copolymers and any thermoplastic resin which may be suitably modified to meet these criteria is applicable. The polar groups pendant to the thermoplastic backbone should be present in from at least about 0.2 to about as high as 15 mole % (i.e., 0.2-15 moles per mole of monomer repeating unit), preferably 0.5 to 10 mole % of the total polymer. Thermoplastic ionomers having weight average molecular weight of from about 5,000 to 500,000 and higher are applicable in the instant invention.

Typical representative examples of thermoplastic ionomers useful in the instant invention include sulfonated polystyrene, sulfonated poly-tertiary butylstyrene, sulfonated polymethylstyrene, sulfonated poly-α-methylstyrene, sulfonated polyethylene, sulfonated polypropylene, sulfonated polybutene-1, sulfonated styrene/methyl methacrylate copolymers, sulfonated styrene/acrylonitrile copolymers, sulfonated styrene/methacrylonitrile copolymers, sulfonated polyformaldehyde and copolymers, sulfonated polyvinylchloride, sulfonated block copolymers of polyethylene oxide and polystyrene, acrylic acid copolymers with styrene, acrylic acid copolymers with methyl methacrylate. Preferably, the thermoplastic ionomer will be sulfonated polystyrene or sulfonated poly-t-butyl styrene and its copolymers.

The liquid medium in which the thermoplastic composition is suspended in finely divided form may also be referred to as the plasticizer for the system. When the thermoplastic composition employed is a multiphase block or graft copolymer as previously described, the plasticiser is a relatively nonvolatile liquid which solvates only one phase of the multiphase composition. By "nonvolatile" is meant that the normal boiling point of the liquid should be in excess of at least about 120° C., preferably in excess of about 150° C., and most preferably in excess of above 200° C. If the plasticizer is too volatile, the plasticized product would lose plasticizer with a resulting undesirable change in physical properties. Therefore, liquids with low vapor pressures are desired.

In order to determine which liquid media are suitable for use as plasticizers in the instant invention, it is necessary to pick a material which is not only liquid and relatively nonvolatile but also will solvate primarily the particular polymer phase desired. That is, the plasticizer must be capable of plasticizing the B block of the multiphase thermoplastic above the softening point of that block but must be incapable of substantially plasticizing the A block, i.e. no more than about 10% of the added plasticizer should be incorporated with the A block. A simple method for determining what liquids will be effective plasticizers for a given polymer phase in the present invention has been discovered. It has been found that the compatibility of a high molecular weight homopolymer with a given plasticizer is an excellent criterion to determine whether or not that polymer will be plasticized by the liquid medium employed when the polymer is used as a polymer block of the multiphase thermoplastic. As an illustration, a polystyrene-poly-t-butylstyrene-polystyrene block polymer may be considered. It has been discovered that those liquids which will dissolve poly-t-butylstyrene at a temperature near or above its softening point and which will not exude from this homopolymer at ambient temperature, and yet will not dissolve polystyrene homopolymer, are effective plasticizers for that system. However, liquids which are compatible with polystyrene (i.e., dissolve the homopolymer), are not effective plasticizers for the illustrated system because they will not selectively solvate the desired phase.

In other words, plasticizers for multiphase copolymers of the type described above containing polymer blocks A and B may be readily selected by the following simple test. One gram of homopolymer A and homopolymer B are each combined with 100 grams of the prospective plasticizer and each heated to a temperature near or above the softening point of the homopolymer and then cooled to room temperature. If homopolymer B dissolves under these conditions and homopolymer A does not, the liquid medium will make an acceptable plasticizer for the system.

Examples of suitable plasticizers for a polystyrene block are: dibutyl phthalate, dihexyl phthalate, dioctylphthalate, tributyl phosphate, etc. Suitable plasticizers for a poly(-t-butyl styrene) block are: paraffinic based oils, didecyl phthalate, ditridecylphthalate, etc. Suitable plasticizers for for a block polymer of polyphenylhydroxy ether of bisphenol A are diethyl phthalate, dibutyl phthalate, and low molecular weight condensation polyesters of 1,4-butane diol and adipic acid or 1,6-hexane diol and adipic acid, said polyesters being liquid and having viscosities at room temperature of 500 to 50,000 centipoises. Suitable plasticizers for a polyvinyl acetate block are diethyl phthalate, dibutyl phthalate, dihexyl phthalate, tributyl phosphate, etc.

It is noted that the multiphase copolymer should not imbibe the plasticizer so that fluidity at room temperature is diminished to a substantial extent; i.e., the suspension must remain essentially in liquid form. This means that the plasticizer should plasticize the selected block at a rapid rate only near or above that block's softening point. Since the polymer blocks employed are thermoplastics, however, this consideration is not of major importance unless the suspensions are stored at elevated temperatures or at ambient temperatures for long periods of time before undergoing the curing process.

When thermoplastic ionomers, as described above, are employed the plasticizer must act on the thermoplastic backbone. The plasticizer used with these thermoplastic ionomers is selected by the same procedure as the plasticizer employed for the multiphase block or graft copolymer. That is, the plasticizer must be a nonvolatile liquid as previously described and it must solvate a high molecular weight homopolymer, (i.e., the thermoplastic backbone) near or above its softening point as previously described. The ionomeric domains in the thermoplastic ionomer may be considered to perform an analogous function to the unplasticized polymer block in the multiphase copolymer. However, some distinctions must be drawn. In order to allow the ionomer to be readily processible to form the suspension of the instant invention, it is much preferred that these ionic domains themselves be temporarily plasticized. That is, while the thermoplastic backbone will remain permanently plasticized (as does the B block in the multiphase plastic), the ionic domains will be plasticized only for sufficient time to allow preparation of the product. To distinguish the plasticizer employed for the ionic domain from the plasticizer employed for the thermoplastic backbone, the plasticizer for the ionic domain will hereafter be referred to as the preferential plasticizer. Therefore, as used herein, preferential plasticizers will mean plasticizers which primarily relax ionic bonds and therefore disrupt the ionic domains of the ionomer. In order to perform this function, these preferential plasticizers must be dispersible in the ionomer and must be liquid during processing of the ionomer. They must also possess at least one functional constituent which exhibits a bond moment whose absolute value is at least 0.6 and preferably at least 0.7 debyes. This requirement is necessary in order that there be sufficient polarity within the plasticizer molecule to attack the ionomeric crosslinkages.

Typical examples of functional constituents which exhibit acceptable bond moments are listed in Table I below. This table is, of course, not meant to be exhaustive, and any functional constituents not shown below which nonetheless have bond moments of at least 0.6 debyes are also useful.

TABLE I

| Unit | | Bond Moment* (Debyes)(Absolute Value) |
|---|---|---|
| C=O | (1) | 2.4 |
| C—O | (1) | 0.86 |
| O—H | (1) | 1.53 |
| N—H | (1) | 1.31 |
| C—Cl | (1) | 1.56 |
| C—F | (1) | 1.51 |
| C—S | (2) | 1.0 |
| C=S | (2) | 2.7 |
| C—Br | (1) | 1.48 |
| SH | (1) | 0.68 |
| NO | (3) | 4.4 |
| C≡N | (1) | 3.6 |
| S→O | (4) | ~2.9 |
| P—Cl | (1) | 0.81 |
| S—Cl | (2) | 0.8 |
| Cl—O | (1) | 0.7 |
| P—O | (4) | 2.8 |
| P—S | (4) | 3.2 |
| B—O | (4) | 3.7 |

TABLE I-continued

| Unit | Bond Moment* (Debyes)(Absolute Value) |
|------|----------------------------------------|
| S—B (4) | 3.9 |

(1) C. P. Smythe, J. Phys. Chem., 41, 209 (1937).
(2) C. P. Smythe, J. Am. Chem. Soc., 60, 183 (1938).
(3) E. P. Linton, J. Am. Chem. Soc., 82, 1945 (1940).
(4) G. H. Phillips et al, J. Chem. Soc., 146 (1945).
*C—H bond moment reference point is 0.3.

Within the above description of preferential plasticizers there are two useful types. These will be designated as volatile and nonvolatile plasticizers. The major practical difference between the two is that the nonvolatile plasticizers remain with the final product while the volatile plasticizers are evolved from the ionomer once they have performed their function.

The nonvolatile plasticizers have, in addition to the above-mentioned properties, a melt point or reversible decomposition point which is substantially above room temperature (i.e., at least about 35° C., and preferably at least about 45° C. This melt point should also be in the vicinity of the preselected processing temperature, i.e., at or below the preselected processing temperature.

The nonvolatile preferential plasticizers useful in the instant invention plasticize ionomers only when in the fluid state; they act essentially as fillers at temperatures below their melting points. However, in order for these plasticizers to be useful, they must be readily dispersible in their solid state in the ionomer of interest. It is often helpful, therefore, if the plasticizer contains one or more hydrocarbon moieties. However, it must not be so readily dispersible that it becomes completely molecularly soluble in the ionomer. If this were the case the plasticizer would not retain an independent melt point and would act as a plasticizer at all temperatures.

Typical examples of nonvolatile preferential plasticizers include polar materials containing oxygen, phosphorus or nitrogen atoms. Examples of these plasticizers include compounds such as calcium stearate, zinc laurate, aluminum ricinoleate, lauric acid, benzyl alcohol, resorcinol, distearate ketone, diglycol distearate, dimethylphthalate, nonyl phenol, nonyl phenoxide, triphenylphosphate, tris(3,5-dimethylphenyl) phosphate, diphenylguanidine, piperazine, hydrated salts such as $Li_2SO_4.H_2O$, etc., alcoholated salts such as $CaCl_2.(CH_3OH)_4$, etc.

The second type of preferential plasticizer is the volatile plasticizer. This type of agent relaxes the ionic bonds in the system across the range of temperatures from its melting point to its actual boiling point and allows fabrication of the ionomer to take place across the same temperature range.

Typical examples of volatile preferential plasticizers include water and ethers such as tetrahydrofuran; p-dioxane; diethyl ether; butylphenyl ether; alcohols such as methyl alcohol, isopropyl alcohol, and n-butyl alcohol, etc.; phosphorus containing compounds such as tributylphosphate, triisopropylphosphate, etc.; materials containing halogens such as chloroform, bromoform, 1,1,1-trichloroethane, 1-chlorooctane, etc.; materials containing nitrogen such as ethylamine, aniline, dihexylamine, etc.; materials containing sulfur such as 1-butanethiol, etc.

Use of the nonvolatile preferential plasticizer has advantages in that, since it is present below its melting point as a filler, the material may be readily reworked. Further, there is no loss due to shrinkage when employing nonvolatile preferential plasticizers (although even when employing volatile preferential plasticizers the amounts used are so low that loss due to shrinkage is generally negligible). The nonvolatile plasticizers, because of their continual presence in the system, however, do set an upper use limit for the material formed in any subsequent application. Volatile preferential plasticizers, on the other hand, do not restrict upper use limits of the final product since they are evolved from the system. If volatile preferential plasticizers are employed and reworking of scrap is desired, it is necessary to add additional volatile plasticizer.

Whether employing volatile or nonvolatile preferential plasticizers, the amount to be added should be enough to just disrupt the ionic domains of the ionomer. Of course, this amount will be dependent upon the mole % of polar groups pendant to the thermoplastic backbone in forming ionomeric linkages. However, the amount will normally be in the range of from about 0.1 to about 50, preferably about 0.2 to 20, moles plasticizer per moles of ionic or polar groups.

Returning now to the plasticizer previously discussed (i.e., the plasticizer for the polymer block in the multiphase thermoplastic, or the plasticizer for the thermoplastic backbone in the ionomer), it has been found that the amount of plasticizer that can be employed in this process is dependent on polymer composition, desired physical properties, and viscosity characteristics of the suspension. In general, however, the amount of plasticizer can vary from below about 30 wt. % up to and greater than 100 wt. % of the polymer block being plasticized. An upper limit of plasticizer content depends upon the physical properties of the fabricated object. From practical considerations, for most applications it is preferred that an upper limit of plasticizer content be on the order of no more than about 500% of that of the total mass of the multiphase plastic being plasticized. In other words, if the plasticizer exceeds the polymer weight by over fivefold, the resulting plasticized object may possess reduced strength properties.

The viscosity of the suspension will depend on the polymer concentration (or solids content), the polymer particle size, the viscosity of the plasticizer itself and finally on the interaction of plasticizer with the multiphase plastic. When the polymer mass is suspended in the proper plasticizer, the resulting liquid suspension should have a suitable viscosity, i.e. viscosity in the range of about 500 to about 100,000 centipoises. It is also desirable that the viscosity of the resulting suspensions be reasonably stable with respect to time. Depending on the particle size, multiphase polymer structure and composition, and choice of plasticizer there may be some viscosity increase over a period of hours or days immediately after the suspension is prepared. This is a natural consequence of mild solvation action on that phase of the plastic which is to be plasticized. For most applications, this viscosity change should be limited to an increase of 100% within 24 hours. Greater viscosity changes can be considered tolerable but such changes might restrict the time period during which the suspension could be stored prior to fabrication.

The plasticizer may also be diluted with volatile organic diluents to decrease the viscosity of the suspension and to permit improved flow at a high solids (i.e. polymer) level. During the later heating process, the volatilization of such diluents still permits the preparation of a plasticized fabricated object. The presence of such volatile components will, of course, complicate the process; however, the improved viscosity characteristics of the system may make the overall combination desirable in some coating applications. It is also noted that the plasticizer may itself contain polar substituents and thereby serve a dual role as both plasticizer and preferential plasticizer when using a thermoplastic ionomer. Use of a separate preferential plasticizer as discussed above is, however, generally more desirable.

The thermoplastic composition to be employed in the instant invention is dispersed in the liquid medium (i.e. the plasticizer) in such amounts that solids content of the resulting suspension is in the range of about 15 to about 75 wt. %, and preferably about 30 to about 65 wt. %, of polymer. The thermoplastic composition should be in finely divided form in the suspension, i.e., average particle size should generally be on the order of from about 0.1 to about 200 microns, preferably 0.2 to 100 microns, and most preferably from 0.4 to 40μ.

Once the suspension is prepared it may be readily applied to any desired surface, e.g., by dip casting, slush casting, rotational casting, spraying, spreading, etc. The surface to which the suspension has been applied is then heated to a temperature at least approximately equal to that of the highest softening point of the composition. Alternatively the surface may be heated to such a temperature prior to application thereto of the suspension. This simple heating step induces a liquid-solid transition which solid will take the shape of the surface to which the suspension has been applied. Cooling the surface permits the recovery of the fabricated object which is now a plasticized semi-rigid or elastomeric product of high strength. The heating step may be performed in stages. After application of the suspension to a suitable surface, substrate and suspension may be heated to a temperature near that of the lower softening phase. This will induce a gelation. In this state the suspension no longer is a liquid, nor has it yet achieved its final plasticized state, however, in this state the product has dimensional stability and may be cooled, or even handled without cooling. In this gelled state the coating will retain its dimension stability. At any subsequent time this gelled state may be finally cured by heating to a temperature approximately equal to that of the higher softening point of the multiphase plastic. The recovery of the fabricated object in plasticized semi-rigid state is then achieved after cooling.

The instant invention can thus be seen to be useful in preparation of a wide variety of products, e.g. wire coatings, coatings on textiles, leather-like upholstery, flexible sheets, toys, etc.

The following examples are presented to further illustrate the instant invention.

EXAMPLE 1

A high molecular weight block copolymer of the ABA type was prepared employing anionic polymerization techniques. The terminal (A) blocks were polystyrene and the center (B) block was poly-t-butyl styrene. This block copolymer will be represented as (25S-50TBS-25S) where the numbers represent weight percent polystyrene and poly-t-butyl styrene. Thus, in this case the terminal blocks were 25 percent polystyrene, while the center block was 50 percent poly-t-butyl styrene. This block copolymer was finely divided by pulverizing the coarse copolymer particles with mortar and pestle after first chilling the polymer with liquid nitrogen. The resulting powder was then screened with a fine wire mesh such that a powder which penetrated 100 mesh screen was obtained. While the powder was not uniform in size, the largest particles were about 150μ and the average particle size was estimated at about 100μ. This product had the consistency of talcum powder.

Three parts of this finely divided 25S-50TBS-25S block polymer were added to 10 parts of ditridecyl phthalate. The resulting mixture was a viscous suspension which showed no obvious viscosity changes at room temperature over a period of one hour. The liquid suspension was then poured into a small metal mold containing several floral shaped cavities. The metal mold containing polymer suspension was then placed in a forced air oven at 275° C. for ½ hour. Before heating, the suspension appeared opaque. After 15 to 20 minutes heating, the entire mass became clear and colorless, indicating the plasticization process had taken place. Upon cooling to room temperature, the product was quite tough, transparent and elastic. Excellent reproduction of mold detail was observed in the product.

EXAMPLE 2

A sample of poly-t-butyl styrene is prepared and then sulfonated to a level of about 4 mole percent. The sulfonate groups are then reacted stoichiometrically with KOH. Fifty parts of a fine (1 to 25μ in diameter) suspension of this polymer are suspended in 100 parts of ditridecylphthalate containing 1 part of 1-hexanol (a preferential plasticizer). The moderately viscous suspension is poured into a mold cavity and heated to 150° C. for a short period (5 to 45 minutes) to plasticize the poly-t-butyl styrene, and also permit the alcohol to solvate the ionic domains. This attack on both phases permits complete fusion of the entire mixture, followed by volatilization of the alcohol.

Such a system is especially desirable because the loss of the volatile polar molecule would result in a product which is essentially crosslinked through ionic association. Consequently resistance to flow at high temperatures, an attribute of particular importance in wire coating applications and other similar applications, is obtained.

EXAMPLE 3

A plasticizer composed of 1 part of an oil, (said oil having an average molecular weight of about 500 by vapor pressure osmometry, based on paraffinic and naphthenic hydrocarbons with a specific gravity at 15.6° C. of 0.885, and with a kinematic viscosity measured at 20° C. of 240 cs, and a Refractive Index at 20° C. of 1.4823) and 1 part of ditridecylphthalate was prepared by mixing equal weights of the two components. This mixture was clear, moderately viscous and will be referred to as the "plasticizer" in this example. The polymer sample to be plasticized in this example was prepared via anionic polymerization, and contained 50 weight percent poly-t-butylstyrene as the center block, and two terminal 25 weight percent polystyrene blocks. This three block polymer was clear when molded and quite brittle. The polymer was cooled with liquid nitrogen and ground with mortar and pestle such that the average particle size permitted passage through a 60 mesh screen. The resulting screened powder had the consistency of a coarse talcum powder.

Two plasticizer-polymer mixtures were prepared with these materials as follows:

(3A) Two parts plasticizer and 1 part polymer were combined by stirring in a small beaker at room temperature. The resulting mixture had the consistency of a loose paste. Mixture was opaque.

(3B) Four parts plasticizer and 1 part polymer were combined as in (3A). The result was a suspension of solid particles in a viscous oil. Mixture was opaque.

These plasticizer suspensions were then placed into a suitable mold cavity. While (3B) could be flowed properly, (3A) had to be scraped and leveled since it was too viscous to flow without assistance. The molds were then exposed to a forced air oven maintained at 185° C. for 30 to 45 minutes. During that period mold temperature achieved about 150° C. Both (3A) and (3B) changed dramatically in appearance upon heating. Prior to heating these systems were opaque and sticky suspensions. With sufficient heat they both became clear and homogeneous. Upon cooling they were elastomeric solids which retained their shape when removed from the mold cavity. Both were soft, flexible and elastomeric. They exhibited a slight tackiness but no signs of cold flow. Quite clearly these materials were physically crosslinked.

Their physical properties were measured on an Instron testing machine at a crosshead speed of 5"/min. and a chart speed of 10"/min. The resulting measurements were obtained:

| Elongation | 100% Tensile Modulus psi | 200% Tensile Modulus psi | 300% Tensile Modulus psi | Break Tensile Modulus psi | Elongation at Break |
|---|---|---|---|---|---|
| Sample 3A | 37 | 137 | 217 | 219 | 305% |
| Sample 3B | 4 | 19 | — | 50 | 220% |

The resulting products were also analyzed for their softening behavior using thermomechanical analysis. As expected, two softening transitions were found:

| Sample | $T_{g_1}$ | $T_{g_2}$ |
|---|---|---|
| 3A | −48° C. | +71° C. |
| 3B | −53° C. | +65° C. |

The results obtained via TMA (Thermomechanical analysis) are significant for they demonstrate that the fabricated object displays two softening points, confirming the two-phase nature of the product. This finding, in turn, shows that the selective plasticization process was indeed effected by simply applying heat to a suitable multiphase plastic dispersed in a suitable plasticizer.

EXAMPLE 4

A mixed plasticizer was prepared as in Example 3. 2.0 parts of multiphase plastic (25S-50TBS-25S) in finely divided form (60 mesh) were suspended in 6 parts of this plasticizer. The resulting suspension was viscous but did flow at room temperature. An aliquot of this suspension was poured into a round bottom flask and rotated in several directions to achieve a smooth coating of the opaque suspension within the vessel. The vessel was exposed to a steam bath for several minutes, a procedure which apparently gelled the suspension since it no longer flowed smoothly. The vessel was then exposed to a gas flame for several moments, constantly rotating it in several directions. After several minutes the opaque coating became clear and colorless. After several more minutes of heating the vessel was quenched in water at room temperature.

The coating inside the vessel had solidified and was easily stripped free from the glass to yield an exact duplicate of the flask interior. The object was clear, elastomeric, and exhibited excellent dimensional stability. It could be inflated like a balloon, and returned to its original shape when the pressure was released.

This experiment demonstrates very successfully that this procedure can be used to prepare a variety of fabricated objects, even automobile tubes or tires under proper circumstances.

EXAMPLE 5

This example illustrates this invention as applied to a sulfonated polystyrene and also illustrates the influence of a domain plasticizer in expediting the fusion of the liquid suspension. A sulfonated polystyrene was prepared such that on the average 2.8 mole percent of the styrene repeating units were substituted by sulfonic acid. The resulting product was neutralized with a stoichiometric amount of sodium hydroxide so that the sodium salt of the sulfonate was obtained. This polymer will be referred to as S-PS. This fluffy sample was then ground to a fine powder by means of a high speed agitator and the entire sample was passed through a 100 mesh screen. The resulting fine powder was estimated to have an average diameter of 100μ.

Two plasticizer polymer mixtures were prepared with these materials as follows:

(5A) 2 parts of dioctyl phthlate were added to 1 part of the finely divided S-PS and mixed well at room temperature to give a moderately viscous liquid dispersion.

(5B) 2 parts of dioctyl phthalate were added to 1 part of the finely divided S-PS, and to this suspension was added 0.05 parts of zinc stearate. The suspension was mixed well to give a moderately viscous liquid dispersion.

In both cases there was no noticeable change in suspension viscosity over a 2½ hour period denoting a reasonably stable dispersion. To determine whether there was a significant difference in fusion of samples 5A and 5B, their softening behavior was examined on a heated gradient bar. Thus a Kofler hot bench which possesses a continuous temperature gradient from 30° C. and 300° C. was employed and portions of 5A and 5B were laid down to give a uniform strip of each (¼" wide) over the temperature range of 70° to 130° C. After only 5 minutes both samples had gelled in the temperature range of 108° to 130° C., however, both materials were still opaque denoting a lack of complete curing. At lower temperatures, the samples were still liquid.

After 10 minutes (5B) had become clear denoting a uniform curing at a temperature from 130° down to 120° C. Sample 5A however was still opaque. Only after 20 minutes of heating was any evidence of curing observed in 5A as determined by clarity and this was only observable near 130° C. However in the case of 5B, there was evidence of fusion down to 100° C. Thus the presence of zinc stearate as a domain plasticizer clearly expedited the fusion process for the liquid dispersion. After removal from the hot stage both samples displayed substantial tensile strength in those portions of the heated dispersion where clarity (and therefore curing) was apparent.

EXAMPLE 6

Two samples were prepared exactly as described in Example 5. These (6A and 6B) were identical in composition to 5A and 5B using the same sample of finely divided S-PS. The dispersions were each poured onto separate suitable mold cavities at room temperature, and heated in a forced air oven maintained at 125° to 135° C. After 25 minutes 6A had gelled while 6B required about 15 minutes. Both samples were removed from the oven after 55 minutes at which time they had reached a temperature of about 135° C. Both were clear, however, the surface of sample 6B was considerably smoother indicating better flow during the curing period. Both samples were cooled and removed from the molds to provide a flexible, tough, not tacky product.

The physical properties of both samples were obtained as described in Example 3. The following data were obtained:

|    | Tensile at Break psi | Elongation at Break |
|----|----------------------|---------------------|
| 6A | 51                   | 187                 |
| 6B | 79                   | 369                 |

The improved curing obtained in the presence of zinc stearate is clearly manifested in the higher tensile strength and elongation of sample 6B over that of 6A.

EXAMPLE 7

Using the same sample of finely divided S-PS described in sample 5, the following liquid suspensions were prepared:

(7A) 2 parts dihexyl phthalate were combined with 1 part of S-PS and stirred to give an opaque liquid suspension.

(7B) 2 parts dihexyl phthalate were combined with 1 part of S-PS and 0.015 parts of hexyl alcohol to give an opaque liquid dispersion.

Both samples were poured evenly into separate mold cavities and placed in a forced air oven nominally thermostated at 140° C. After about 55 minutes both samples were removed from the oven—at which time the temperature of the mold cavities was about 138° C. The samples were cooled and removed from the molds. Both were clear and flexible, almost elastomeric. Sample 7B was somewhat clearer and less granular than sample 7A, again denoting the effect of the domain plasticizer. Tensile properties were obtained on both samples:

|           | Tensile Strength at Break psi | Elongation at Break |
|-----------|-------------------------------|---------------------|
| Sample 7A | 42                            | 1780                |
| Sample 7B | 41                            | 1739                |

EXAMPLE 8

The same experiments were conducted as described in Example 7 except only 1 part of dihexyl phthalate was combined with 1 part of S-PS. Otherwise the curing process was conducted in a similar manner. In this case it was again observed that the sample containing hexyl alcohol fused to yield a product with a smoother surface. Physical properties were obtained:

|           | Tensile Strength at Break psi | Elongation at Break |
|-----------|-------------------------------|---------------------|
| Sample 8A | 226                           | 738                 |
| Sample 8B | 223                           | 723                 |

It is evident that with the samples of S-PS plasticized with dihexyl phthalate, the influence of the domain plasticizer on the physical properties is less pronounced than in the case of dioctyl phthalate. This behavior is interpreted as a manifestation of the higher polarity of the dihexyl phthalate permitting it to act, in part, as a mildly efficient domain plasticizer as well as a plasticizer for the polystyrene phase. The ability of dioctyl phthalate to act in this manner is less pronounced due to its less polar structure.

EXAMPLE 9

This example illustrates this invention as applied to a barium salt of sulfonated polystyrene. The preparation of the metal sulfonated polystyrene was accomplished by neutralizing a polystyrene which had 2.8 mole percent of the styrene repeating units substituted by sulfonic acid. The neutralization was performed by adding a stoichiometric amount of barium acetate dispersed in a water-ethanol solution. The resulting product, when precipitated and dried was a white fluffy powder. This barium salt of sulfonated polystyrene was finely divided by grinding and the sample passed through a 325 mesh screen. The resulting powder was extremely finely divided and estimated to have an average diameter of 25 to 30$\mu$.

Two plasticizer-polymer mixtures were prepared with these materials as follows:

(A) 2 parts of dihexyl phthalate were added to 1 part of the finely divided powder and mixed well at room temperature to provide a liquid dispersion. This dispersion was less viscous than those previously described, probably due to the finer particle size.

(B) 2 parts of dihexyl phthalate were added to 1 part of the finely divided powder, mixed well, and 0.015 parts of hexyl alcohol was added to give a liquid dispersion. Again this dispersion was less viscous than those prepared with larger particle samples.

Both samples were poured into separate mold cavities and placed in a forced air oven maintained near 140° C. After about 50 minutes both samples had reached a temperature of 135° to 138° C. and had become clear and fused. The mold was cooled to room temperature and the samples removed. Both samples were clear, flexible, elastomeric and possessed substantial strength.

EXAMPLE 10

This example illustrates the application of this invention to a multiphase plastic of the type $(AB)_n$. In particular the high softening A phase is a crystalline polyamide, and the low softening B phase to be plasticized is a polystyrene. The preparation of A and B polymer blocks is described. The preparation of the multiphase plastic and subsequent plasticization is also illustrated.

Preparation of $\alpha,\omega$-dihydroxyl polystyrene; $Mn \sim 15,000$

In a flask which has been oven dried and evacuated is placed 400 ml benzene and 0.0069 moles a dilithium initiator formed from divinyl benzene and sec-butyl lithium at 25° C. To this mixture is added 57.3 ml (0.5 mole) purified styrene. Initiation and polymerization start within a few minutes as indicated by the rise in temperature. The polymerization is continued for 40 mins. At the end of this time the reaction is terminated with 20 ml of distilled styrene oxide. The polymeric lithium alkoxide is finally hydrolyzed with a 50/50 mixture of aqueous HCl. The $\alpha,\omega$-dihydroxyl polystyrene is then precipitated with methanol and dried in a vacuum oven for ~18 hrs.

Preparation of Amine terminated Poly(sebacyl piperazine)

62.5 gm recrystallized piperazine is dissolved in 1 liter of distilled chloroform in a flask equipped with stirrer and dropping funnel containing 60.3 gm sebacyl chloride in 300 ml chloroform. The Sebacyl chloride is slowly added stirring over a 2 hr. period. After the addition of the sebacyl chloride the reaction is continued for 30 mins. The product is finally precipitated in hexane, filtered and washed with water and then acetone. The number average molecular weight as measured by vapor pressure osmometry in O-dichlorobenzene at 130° C. is about 6200. The melting point of this polyamide is about 170° to 175° C.

Preparation of Block Copolymer of Polystyrene and Poly(sebacyl piperazine) $(AB)_n$ To a flask containing 0.1371 gm toluene diisocyanate and 0.02584 gm of triethylene diamine in 20 ml Na-dried toluene is added dropwise a solution of 5.75 gms $\alpha,\omega$-dihydroxyl polystyrene in 80 ml Na-dried toluene. This reaction is continued for 24 hrs. A sample is tested by placing it in a test tube with ethylene diamine. It immediately gels indicating that the product is primarily end capped with isocyanate groups.

To this TDI capped polystyrene is added 2.36 (0.00038 moles) gm of poly(sebacyl piperazine) in 50 ml methylene chloride. The solution immediately becomes viscous. The reaction is continued for 1 hr. after which it is terminated by 5 ml of a 4% butylamine solution. The block polymer is precipitated in n-heptane and is dried under vacuum for 7 hrs. (1–2 mm Hg @50° C.).

Plasticization of the $(AB)_n$ Polyamide-Polystyrene Block Copolymer

The multiphase block polymer is finely divided by grinding under high shear and passed through a screen to give a finely divided product with average particle size of 25 to 30$\mu$. 2 parts of dihexyl phthalate is added to 1 part of the powder and the mixture is stirred to give an opaque, moderately viscous liquid dispersion. The dispersion is poured into a suitable mold cavity and heated to 110° C. for about 20 minutes. At this time the suspension is gelled but not fully cured. The mold is then heated to about 180°–190° C. for about 20 minutes at which time the plasticized composition fully cures. After cooling the product is removed from the mold and is a tough flexible, semi-elastomeric product of high strength.

Although the above examples adequately illustrate the instant invention, it should be understood that the invention is in no way meant to be limited thereby. The invention is limited only by the claims which follow.

What is claimed is:

1. A process for fabricating an article from a thermoplastic composition, said thermoplastic composition being a thermoplastic ionomer, that is, a polymer having a backbone composed of a thermoplastic resin and having polar groups pendant to that backbone, which comprises the steps of:
   (a) suspending said thermoplastic composition in finely divided form in a liquid medium in such amount that solids content of the resulting suspension is in the range of from about 15 to about 75 wt. %; said liquid medium being nonvolatile and being capable of plasticizing the backbone near or above the softening point of that backbone;
   (b) applying said suspension to a surface;
   (c) heating said surface to a temperature at least approximately equal to that of the softening point of said backbone;
   (d) cooling said heated surface to a temperature below that of the softening point of said backbone to form said article in a gelled state; and
   (e) heating at a later time said article in said gelled state to a temperature of about equal to that of the higher softening point of said thermoplastic ionomer to cause curing of said article.

2. The process of claim 1 wherein said polar groups are temporarily plasticized during processing by a preferential plasticizer.

3. The process of claim 2 wherein said preferential plasticizer is dispersable in the ionomer, is liquid during processing of the ionomer and possesses at least one functional constituent which exhibits a bond moment whose absolute value is at least 0.6 debyes.

4. The process of claim 1 wherein the solids content is from 30 to 65 wt. %.

5. The process of claim 1 which additionally comprises the subsequent step of cooling said heated surface to a temperature below that of the softening point of said backbone.

6. The process of claim 1, wherein said polar groups are prepared by neutralizing acid groups selected from the group comprising carboxylic acid, sulfonic acid and phosphonic acid with base metal compounds or basic nitrogen compounds.

7. The process of claim 6, wherein said basic metal compounds are selected from the group comprising of alkali and alkaline earth metal compounds.

8. The process of claim 1, wherein said thermoplastic ionomer is selected from the group comprising sulfonated polystyrene, sulfonated poly-t-butylstyrene and copolymers thereof.

* * * * *